UNITED STATES PATENT OFFICE.

JOHN R. YOUNG, JR., OF NORFOLK, VIRGINIA.

FERTILIZER.

SPECIFICATION forming part of Letters Patent No. 308,397, dated November 25, 1884.

Application filed January 31, 1884. (No specimens.)

*To all whom it may concern:*

Be it known that I, JOHN R. YOUNG, Jr., a citizen of the United States, residing at Norfolk, in the State of Virginia, have invented a new and useful Improvement in Fertilizers, of which the following is a specification.

The primary object of my invention is to utilize night-soil as a fertilizer, and to render it free of its offensive odor and other objectionable qualities by the addition of such chemicals and ingredients as add to its value, while retaining all its own valuable fertilizing properties.

My present invention is an improvement on the several inventions described in the three patents granted to me on the 29th day of May, 1883.

The object of the invention is to raise the fertilizing compounds described in the aforesaid patents to a higher grade or standard and render them more effective in their action on growing crops.

Field tests show that the fertilizing compounds referred to in the aforesaid patents, used either singly or in combination, are materially improved in quality or crop-producing power by the addition of nitrogen or equivalent ammonia and potash. In practice the best results have followed the use of nitrogen or equivalent ammonia in the form of sulphate of ammonia or nitrate of soda, and the potash either in the form of muriate or sulphate. Plant-food is required by different crops in different combinations and in varying proportions; hence it is found advisable to vary the per cent. of ingredients used according to strength of material and amount of nitrogen or ammonia and potash required in the compound. For example, when nitrogen—or equivalent ammonia—is supplied in the form of sulphate ammonia or nitrate soda, eighty pounds of the former or one hundred pounds of the latter should be used for each per cent. of ammonia required to the ton of two thousand pounds, these materials containing, usually, the equivalent of twenty-five per cent. and twenty per cent. ammonia, respectively. If eighty per cent. muriate or sixty-five per cent. sulphate potash be used as the source of potash supply for each per cent. required, forty pounds of the muriate or fifty-seven pounds of sulphate should be used, as they contain fifty per cent. and thirty-five per cent. potash, respectively. After the ingredients furnishing the required percentages of nitrogen or ammonia and potash have been thoroughly mixed with the fertilizing compounds referred to, used either singly or in combination, the improved fertilizer is ready for use.

Having thus described my invention, what I claim as new therein, and desire to secure by Letters Patent, is—

A fertilizing compound consisting of night-soil, phosphate of lime, sulphuric acid, nitrogen compound, (as ammonia,) and potash, substantially as set forth.

J. R. YOUNG, JR.

Witnesses:
M. HARBERT,
R. L. UPSHUR.